(12) United States Patent
Gareau et al.

(10) Patent No.: US 10,116,403 B2
(45) Date of Patent: Oct. 30, 2018

(54) OTN ADAPTATION FOR SUPPORT OF SUBRATE GRANULARITY AND FLEXIBILITY AND FOR DISTRIBUTION ACROSS MULTIPLE MODEM ENGINES

(71) Applicants: Sebastien Gareau, Ottawa (CA); Ronald Gagnon, Ottawa (CA); Andrew McCarthy, Kanata (CA)

(72) Inventors: Sebastien Gareau, Ottawa (CA); Ronald Gagnon, Ottawa (CA); Andrew McCarthy, Kanata (CA)

(73) Assignee: Ciena Corporation, Hanover, MD (US)

( * ) Notice: Subject to any disclaimer, the term of this patent is extended or adjusted under 35 U.S.C. 154(b) by 662 days.

(21) Appl. No.: 14/467,769

(22) Filed: Aug. 25, 2014

(65) Prior Publication Data
US 2016/0056914 A1 Feb. 25, 2016

(51) Int. Cl.
*H04J 3/16* (2006.01)

(52) U.S. Cl.
CPC .......... *H04J 3/1664* (2013.01); *H04J 3/1652* (2013.01)

(58) Field of Classification Search
CPC ... H04L 47/828; H04L 43/0894; H04L 45/50; H04L 47/266; H04L 47/76; H04L 12/6418; H04L 12/66; H04L 41/0803; H04L 41/0853; H04L 41/0896; H04L 41/22; H04L 45/12; H04L 45/42; H04L 45/72; H04L 45/745
USPC ....................................................... 370/464
See application file for complete search history.

(56) References Cited

U.S. PATENT DOCUMENTS

| | | | | |
|---|---|---|---|---|
| 2009/0196602 A1* | 8/2009 | Saunders | ........... | H04B 10/5053 398/26 |
| 2009/0208218 A1* | 8/2009 | Xiao | ..................... | H04J 3/1652 398/83 |
| 2010/0226648 A1* | 9/2010 | Katagiri | ................. | H04J 3/076 398/66 |
| 2013/0243428 A1* | 9/2013 | Mutoh | ................. | H04J 3/1652 398/45 |
| 2014/0255028 A1* | 9/2014 | Haas | ..................... | H04B 10/27 398/66 |

FOREIGN PATENT DOCUMENTS

| CN | 102820951 A | 12/2012 |
|---|---|---|
| EP | 2874332 A1 | 5/2015 |

OTHER PUBLICATIONS

"Proposed model for the OTUCn and OCh layer for OTN beyond 100G," International Telecommunication Union, Jul. 2013, pp. 1-6.

* cited by examiner

*Primary Examiner* — Natasha W Cosme
(74) *Attorney, Agent, or Firm* — Clements Bernard Walker PLLC; Christopher L. Bernard; Lawrence A. Baratta, Jr.

(57) ABSTRACT

Systems and methods for Optical Transport Network (OTN) adaptation to provide sub-rate granularity and distribution include segmenting an OTN signal into N flows of cells with associated identifiers, based on tributary slots of the OTN signal, wherein N≥0, and wherein the cells do not include unallocated payload from the OTN signal; switching the cells to a scheduler; and scheduling, from the scheduler, the cells for a line side modem.

20 Claims, 8 Drawing Sheets

OTN ADAPTATION FOR SUPPORT OF SUBRATE GRANULARITY AND FLEXIBILITY AND FOR DISTRIBUTION ACROSS MULTIPLE MODEM ENGINES

FIELD OF THE DISCLOSURE

The present disclosure relates generally to networking systems and methods. More particularly, the present disclosure relates to Optical Transport Network (OTN) adaptation for distribution to one or more optical modem engines.

BACKGROUND OF THE DISCLOSURE

In Optical Transport Network (OTN), there is momentum regarding flex modulation and flex line rates. There are different ways to achieve a flex rate. For example, some vendors have created proprietary Optical channel Data Unit Group (ODUG) Super High Order (SHO) wrappers to handle cases of 50 G, 100 G, 200 G, etc. for modem technologies. In ITU-T, there have been discussions about defining OTUCn, a byte interleaved scheme for flexibility in increments of 100 G. OTUCn stands for Optical channel Transport Unit Cn where C means 100 and n is a multiplier of 100, e.g. OTUC2 is 200 GB/s, OTUC4 is 400 GB/s, etc. The current ITU-T OTUCn standards are planning on defining a modular (not necessarily flexible) architecture for 100 G slices and granularity. The problem is that this architecture does not give enough granularity on next-Gen devices for bandwidth versus performance/reach tradeoffs. It also does not cover some modulation rates (e.g., 8-Quadrature Amplitude Modulation (8QAM) at 150 G) that are not aligned to 100 G boundaries. Other initiatives have proposals to turn off single or groups of physical, virtual, or logical lanes in a Physical Medium Dependent (PMD) layer to achieve a desired rate. There are some significant implementation and logic complexities when designing a protocol to support multiple different rates at the physical layer.

This flexible line rate is becoming a hot topic in the industry and recent activities by end users include a desire for sub-100 G granularity (25 G or 50 G). Again, some conventional schemes address flexibility by turning off physical or virtual lanes, but complexity and logic cost is significant. Resizing using lanes scheme is also a challenge. The 25 G/50 G granularity does not line up well to existing 10 G traffic. Also, scaling conventional techniques for mux/mapping rates of 10 G up to 500 G requires large logic complexity.

As optical transmission systems start approaching the Shannon limit for non-linear noise and demand for increased data rates continues, Digital Signal Processing (DSP)/modem engines can get implemented in parallel devices or multiple engines get integrated to create super-channels with optical or electrical mixing. Low complexity and flexible schemes are needed for inverse multiplexing ("muxing") and distributing signals across these different channels at the physical layer. To minimize line-side penalties, an equal and symmetrical bandwidth split is required across the multiple engines, and there is high complexity involved to support flexible rate bandwidth splitting. For example, to split 340 G across two devices would be 2×170 G channels, 930 G across three devices would be 3×310 G channels, etc.

There are different conventional techniques developed to handle the breakup and inverse muxing of signals across multiple channels. For example, IEEE has defined Link Aggregation Groups (LAG) and ITU has been using Virtual Concatenation (VCAT) type of schemes of standard defined containers Low Order (LO)/High Order (HO) Optical channel Transport Unit-k (OTUk). LAG is a higher layer protocol utilizing smaller-sized channels to carry a super-channel. The protocol is implemented at Layer 2 (Ethernet) and adds huge complexity and memory requirements. It is typically implemented using a Network Processing Unit (NPU) and other types of devices; LAG is not an appropriate approach to be integrated into optical DSP/modem devices. Standard ITU-defined VCAT schemes include grouping smaller sized standard containers, which would be Optical channel Data Unit-2 (ODU2) to get 10 G granularity on the line side. There is a large logic complexity to map a signal (i.e. 240 G) to nxODU2 (i.e. 24) and then switch and distribute these ODU2 signals across multiple optical DSP/modem devices. The extra mapping complexity can add to wander and decrease network performance.

BRIEF SUMMARY OF THE DISCLOSURE

In an exemplary embodiment, a method for Optical Transport Network (OTN) line side adaptation to provide sub-rate granularity and distribution includes segmenting an OTN signal into N flows of cells with associated identifiers, based on tributary slots of the OTN signal, wherein N≥0, and wherein the cells do not include unallocated payload from the OTN signal; and switching the cells, with a scheduler, to one or more line side modems. The segmenting can be determined based on an Optical channel Path Unit Multiframe Identifier (OMFI) and Multiplex Structure Identifier (MSI) associated with the OTN signal, and N is based on a number of allocated tributary slots in the OTN signal. When N=0, only overhead is provided in the cells to the one or more line side modems. The OTN signal can be an Optical channel Transport Unit (C=100)×n (n=1, 2, 3, . . . ) OTUCn or a High Order or Super High Order OTN signal with tributary slots. A signal provided to the one or more line side modems can be a sub-rate or a full-rate of the OTUCn or the High Order or Super High Order OTN signal with tributary slots. Optionally, the OTN signal can be from a client and the N flows of cells from the client are sent to different line side modems. Alternatively, the OTN signal can be from two or more clients and the N flows of cells from the two or more clients are sent to a same line side modem. The method can further include inserting a framing cell to enable recovery from the one or more line side modems. The scheduling can include switching some of the cells to a first line side modem and a second line side modem.

In another exemplary embodiment, a circuit for Optical Transport Network (OTN) line side adaptation to provide sub-rate granularity and distribution includes cell adaptation circuitry configured to segment an OTN signal into N flows of cells with associated identifiers, based on tributary slots of the OTN signal, wherein N≥0, and wherein the cells do not include unallocated payload from the OTN signal and switch the cells to a scheduler; and line adaptation circuitry configured to schedule, from the scheduler, the cells for one or more line side modems. The N flows can be determined based on Optical channel Path Unit Multiframe Identifier (OMFI) and Multiplex Structure Identifier (MSI), and N is based on a number of allocated tributary slots in the OTN signal. When N=0, only overhead is provided in the cells to the one or more line side modems. The OTN signal can be an Optical channel Transport Unit (C=100)×n (n=1, 2, 3, . . . ) OTUCn or a High Order or Super High Order OTN signal with tributary slots. A signal provided to the one or more line side modems can be a sub-rate or a full-rate of the OTUCn or the High Order or Super High Order OTN signal with tributary slots. The OTN signal can be one of a) from a client and the N flows of cells from the client are sent to different line side modems and b) from two or more clients and the N flows of cells from the two or more clients are sent to a same line side modem. The line adaptation circuitry can be further configured to switch some of the cells to a first line side modem and a second line side modem.

In a further exemplary embodiment, a system for Optical Transport Network (OTN) line side adaptation to provide sub-rate granularity and distribution includes a first adaptation circuit communicatively coupled to a first line side modem; and a second adaptation circuit communicatively coupled to a second line side modem; wherein each of the first adaptation circuit and the second adaptation circuit include cell adaptation circuitry configured to segment an OTN signal into N flows of cells with associated identifiers, based on tributary slots of the OTN signal, wherein N≥0, and wherein the cells do not include unallocated payload from the OTN signal and switch the cells to a scheduler, and line adaptation circuitry configured to schedule, from the scheduler, the cells for one or more line side modems. The N flows can be determined based on Optical channel Path Unit Multiframe Identifier (OMFI) and Multiplex Structure Identifier (MSI), and N is based on a number of allocated tributary slots in the OTN signal. The OTN signal can be an Optical channel Transport Unit (C=100)×n (n=1, 2, 3, . . . ) OTUCn or a High Order or Super High Order OTN signal with tributary slots, and wherein a signal provided to the one or more line side modems is a sub-rate or a full-rate of the OTUCn or the High Order or Super High Order OTN signal. The first adaptation circuit and the second adaptation circuit can be communicatively coupled to one another and configured to provide one or more of the cells to one another.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The following acronyms are utilized herein:

| | |
|---|---|
| ASIC | Application Specific Integrated Circuit |
| BIP | Bit Interleaved Parity |
| CI | Characteristic Information |
| COMMS | Communications channel |
| DSP | Digital Signal Processing |
| FAS | Frame Alignment Signal |
| FEI | Forward Error Indication |
| FPGA | Field Programmable Gate Array |
| GFEC | Generic Forward Error Correction |
| HEC | Header Error Control |
| HO | High Order |
| LAG | Link Aggregation Group |
| LO | Low Order |
| MS | Multiplex Section |
| MSI | Multiplex Structure Identifier |
| PMD | Physical Medium Dependent |
| OAM | Operations, Administration, Maintenance |
| ODU | Optical channel Data Unit |
| ODUflex | Optical channel Data Unit flexible |
| ODUCn | Optical channel Data Unit (C = 100) × n (n = 1, 2, 3, . . .) |
| OH | Overhead |
| OMFI | OPU Multiframe Identifier |
| OPU | Optical channel Path Unit |
| OPUCn | Optical channel Path Unit (C = 100) × n (n = 1, 2, 3, . . .) |
| OTN | Optical Transport Network |
| OTUk | Optical channel Transport Unit level k (k = 1, 2, 3, or 4) |
| OTUCn | Optical channel Transport Unit (C = 100) × n (n = 1, 2, 3, . . .) |
| PCS | Physical Coding Sub-layer |
| PM | Path Monitoring |
| QAM | Quadrature Amplitude Modulation |
| RS | Regenerator Section |
| SAR | Segmentation and Reassembly |
| SD-FEC | Soft Decision Forward Error Correction |
| SDN | Software Defined Networking |
| SHO | Super High Order |
| SM | Section Monitoring |
| SV-IaDI | Single Vendor Intra-Domain Integration |
| TDM | Time Division Multiplexing |
| TS | Tributary Slot |
| VCAT | Virtual Concatenation |

In various exemplary embodiments, OTN line adaptation systems and methods are described. In an exemplary embodiment, an OTUCn line adaptation layer for a proprietary line side (SV-IaDI) splits or segments the OTUCn into 10 G tributary slots (i.e., 10× per OTUC1), and only transmits on the line side the allocated tributary slots and OTUCn overhead. The process removes extra unused capacity of a standard OTUCn 100 G container. This adapts a standard OTUCn frame (or any HO or SHO OTN signal), but utilizes the tributary slot structure within an OPUCn payload to get to 10 G granularity. LO ODUk (k=0, 1, 2, 3, 4, flex) can get mapped into OTUCn tributary slots with 10 G granularity and these will be adapted on the line. On the receive side of the line, the m×10 G signal is reconstituted and put back into an OTUCn standard frame format. Ethernet clients can be sub-rate groomed, then mapped to an appropriately sized ODUflex, and then mapped to m×10 G tributary slots in the OTUCn structure. At the receive side of the line, the ODUflex signal is recovered from the equivalent set of allocated tributary slots.

In another exemplary embodiment, an OTUCn cell adaptation layer for a proprietary line side (SV-IaDI) creates fixed-sized cells from multiple traffic streams. These cells are switched using scheduling algorithms across a cell switch which is distributed outside or inside multiple DSP/modem devices or engines. The switch distributes cells to the multiple DSP/modem devices or engines, which achieves flexible bandwidth split. Cells having taken different paths are deskewed and aligned on the receiver to recreate the original signal. The cells contain unique IDs for switching and path selection within the modem/DSP device scope (and the line adaptation). This provides a process for addressing the complexities of providing flexible bandwidth across multiple modem/DSP devices.

Advantageously, the OTN line adaptation systems and methods align to the ITU-T OTUCn structure and models, but extends the protocol (OTN frame format) to achieve flexible rates at small increments below 100 G. This allows adaptation of a fixed rate interface to a flexible rate line interface. ITU standards are not planning on defining SV-IaDI adaptation for OTUCn. Note, SV-IaDI is an adaptation between standard client interfaces at OTUCn and optical modems. This allows flex line and bandwidth splits among multiple devices/wavelengths. Additionally, the OTN line adaptation systems and methods result in a small logic implementation in comparison to other muxing schemes. Also, the mapping into cells can be protocol agnostic, and does not have to be limited to 10 G granularity. This approach provides flexibility of cells (or packets) to switch and assign different path to the desired Time Division Multiplexing (TDM) (OTUCn) traffic.

The OTN line adaptation systems and methods use OTUCn as SHO (or HO OTUk) to avoid proprietary schemes and align with future 100 G OTN standardization. The OTN line adaptation systems and methods prevent unnecessary mapping/demapping stages by carrying OTUCn OH+payload into cells and only sending used (allocated) tributary slots in 10 G increments (or any other increments). The OTN line adaptation systems and methods carry tributary slots independently whether the traffic source includes a single Cn, groups of Cn (e.g., C5) in single chip or groups of Cn across multi-chips. In this manner, the OTN line adaptation systems and methods disassociate modem rate to OTUC1 and tributary slot structure.

Figure 1:
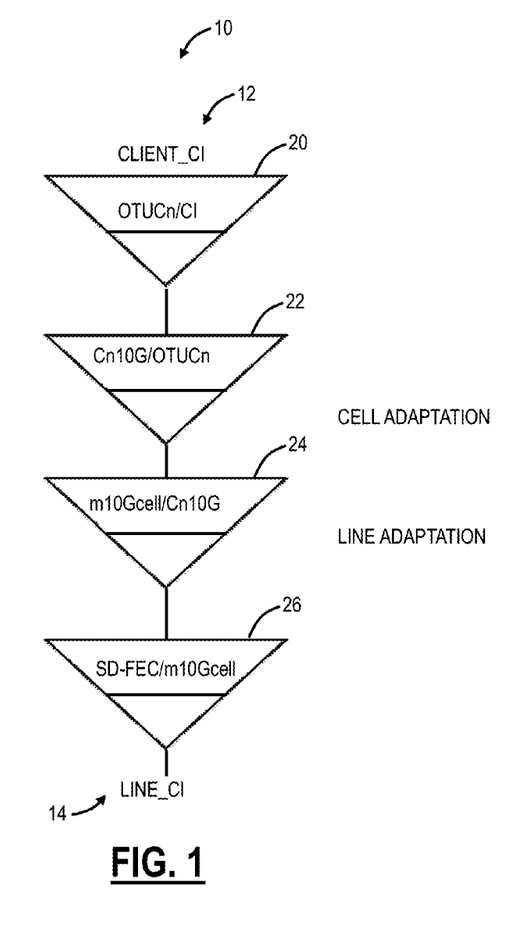
FIG. 1 is an atomic function for an adaptation process of an OTUCn.

Referring to FIG. 1, in an exemplary embodiment, an atomic function diagram illustrates an adaptation process 10. The adaptation process 10 is based on the ITU-T standard OTUCn frame structures and tributary slots. Note, because the adaptation process 10 operates between a client 12 and a line 14, the adaptation of OTUCn for SV-IaDI is not subject to standardization. That is, the adaptation process 10 is used for a vendor's line-side transmission. The adaptation process 10 is illustrated from the top, at a client_CI 12, down to a Line_CI 14. The adaptation process 10 takes in an OTUCn frame (OTUCn/CI 20), breaks-up the 64-byte overhead (per multi-frame OMFI) and 10 G tributary payload into 10×10 G streams (Cn10 G/OTUCn, cell adaptation 22). The individual 10×10 G streams are SARed (create cells/packets), with associated identifiers (IDs) for the streams. The OPUCn MSI OH contains the allocation and structure of the 10 G tributary slots and can distinguish which slots are filled with data and which are empty. The cell adaptation 22 also includes OTUCn BIP compensation, a cell ID for each cell, and timing information.

Subsequent to the cell adaptation 22, line adaptation 24 is performed on the line TX side. On the line TX side, a scheduler can be used and configured to service and interleave only the cell streams that are filled with data (as reflected by the OPUCn MSI). The cell adaptation 22 provides Cn10 G (n×10 G cells) (n≥1), and the line adaptation 24 provides m10 Gcells (not necessarily carrying a multiple of 100 G). The OTUCn/ODUCn/OPUCn OH is distributed across cell streams based on the OMFI. This results in removing unused capacity in the OTUCn structure by only transmitting the used 10 G streams. This also results in 10 G granularity on the line side, but still utilizing the OAM, section and functions of the SHO OTUCn. In the line adaptation 24, since cell streams are interleaved, the OTUCn frame FAS cannot be used for alignment. A special cell can be used for alignment, with fixed occurrence in order to prevent the need for a PCS layer. After the line adaptation 24, SD-FEC 26 can be added and the line_CI 14 can be provided to a modem.

In the opposite direction after transmission on the line RX side, cells are received and reassembled for the used streams and tributary slots. The cell ID is used to distinguish the different streams. A standard OTUCn frame is recreated and empty streams (which have been omitted on the line) are filled in and set as unallocated in the OTUCn frame (MSI). The overall adaptation process 10 includes receiving a standard OTUCn in, performing the adaptation process 10 from the client_CI 12 to the line_CI 14, transmission (between two modems), performing the adaptation process 10 from the line_CI 14 to the client_CI 12, and providing the OTUCn as the output.

Figure 2:
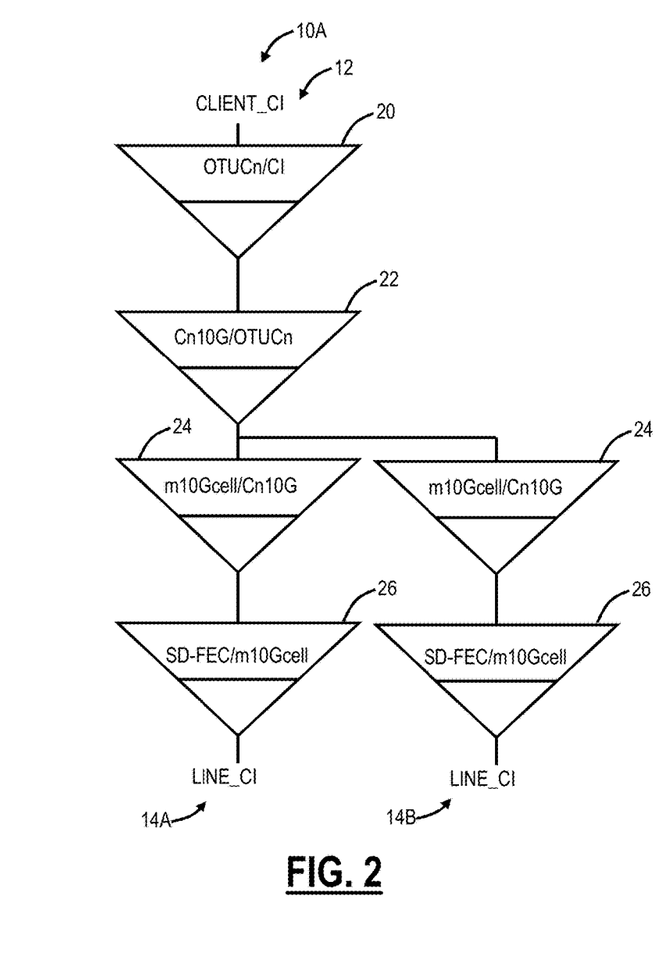
FIG. 2 is an atomic function for an adaptation process where a single client gets split among two or more different line interfaces.
Figure 3:
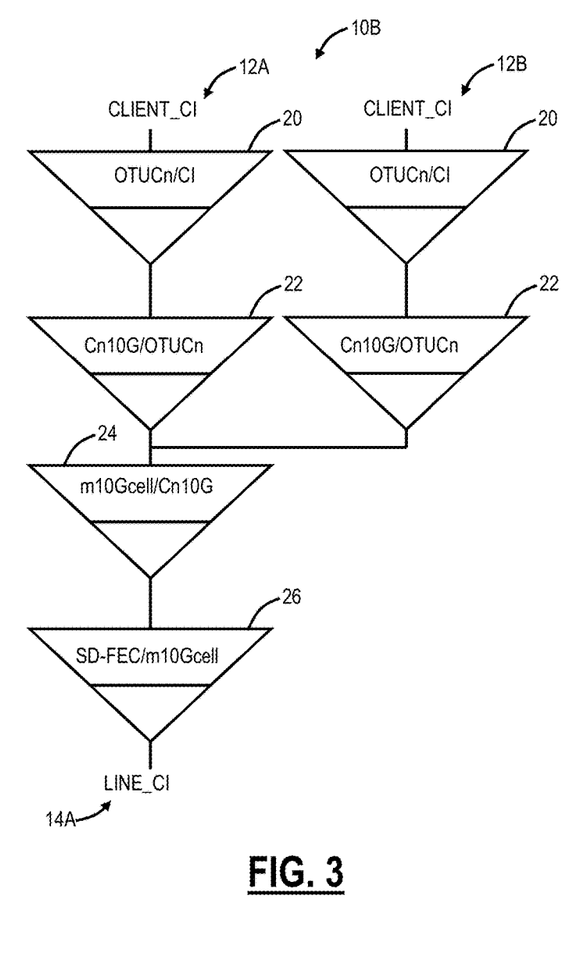
FIG. 3 is a diagram atomic function for an adaptation process where two or more clients are provided to a same line interface.

Referring to FIGS. 2 and 3, in an exemplary embodiment, flow diagrams illustrate an adaptation processes 10A, 10B. The adaptation processes 10A, 10B are similar to the adaptation process 10, but are described to illustrate disassociation of the client_CI 12 from the line_CI 14. On the line TX side, cells are switched (via cell switch) using IDs to redirect a path to an appropriate optical modem/DSP device. Again, the granularity of this switching cell flow can be 10 G; although other rates are possible. Client rates, interfaces and OTUCn frame format is disassociated to the actual line rate and engine instance. A scheduler is used in the line adaptation 24 and modem/DSP device to service the different cell flows destined for its line. On the line RX side, cells received then switched (via cell switch) back to desired OTUCn processing logic and group. Suppose the layer that OTUCn is adapted to is called Cn10 G and the layer below (not carrying a multiple of 100 G) is called m10 Gcell. The number of client interfaces is disassociated from number of line interfaces. For example, FIG. 2 illustrates the adaptation process 10A where a single client, client_CI 12, gets split among two different line interfaces, line_CI 14A, 14B. FIG. 3 illustrates the adaptation process 10A where two clients, client_CI 12A, 12B, are provided to a same line interface, line_CI 14.

Figure 4:
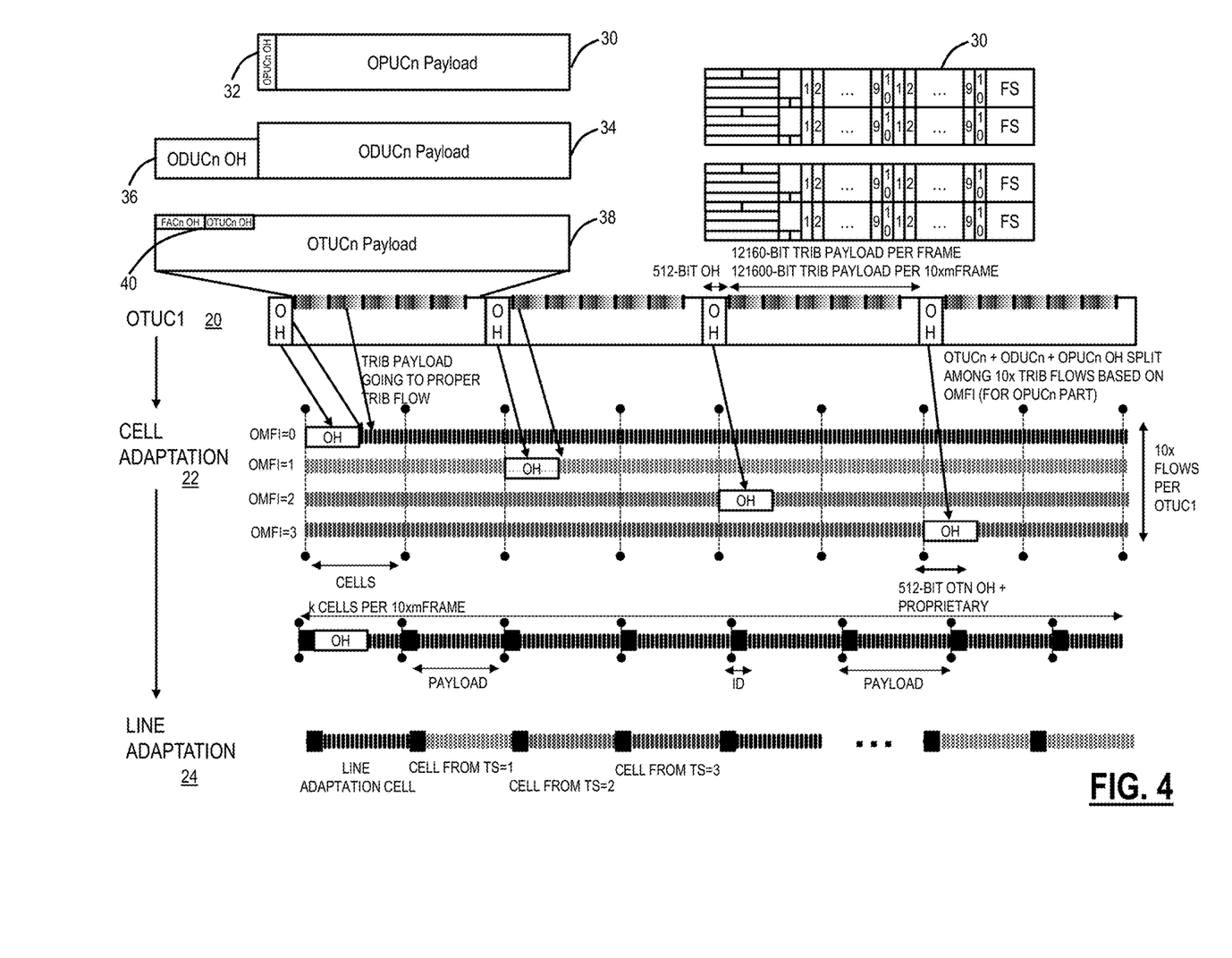
FIG. 4 is a diagram of front-end adaptation with the adaptation process.
Figure 5:
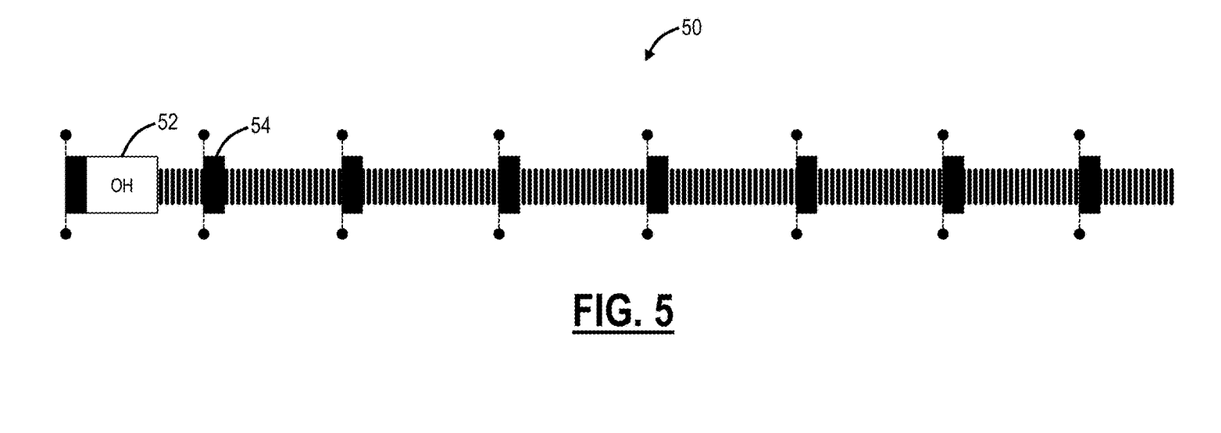
FIG. 5 is a diagram of cell adaptation of a plurality of cells.

Referring to FIG. 4, in an exemplary embodiment, a diagram illustrates the front-end adaptation with the adaptation process 10. FIG. 4 illustrates an example of converting an OTUCn to a modem bus. The OTUCn includes OPUCn payload 30, OPUCn OH 32, ODUCn payload 34, ODUCn OH 36, OTUCn payload 38, and OTUCn OH 40. The OPUCn payload 30 is split into 10 tributary flows or TSs and each of the 10 tributary payloads is mapped to one of the 10× flows per OTUC1, based on OMFI. Note, FIG. 4 illustrates four OMFIs, but there may be 10 in this exemplary embodiment for 10 G tributary slots. The OPUCn OH 32, ODUCn OH 36, and the OTUCn OH 40 is split amongst the 10×× tributary flows based on OMFI.

As described herein, there can be N flows of cells, where N≥0, and each of the N flows represents an allocated tributary slot in the OTN signal, where the sub-rate equals the overall OTN signal rate divided by N. In this example, N=10 and the OTUCn=100, so each flow is 10 G. In the cell adaptation 22, before the cell switch, OTUCn frames (OTUCn/ODUCn/OPUCn OH+tributary payload) are converted into 10× tributary flows and cells. Where N=0, no allocated payload, only overhead is provided from the OTN signal, i.e. the systems and methods contemplate a sub-rate signal where there is no payload, only overhead.

Figure 6:
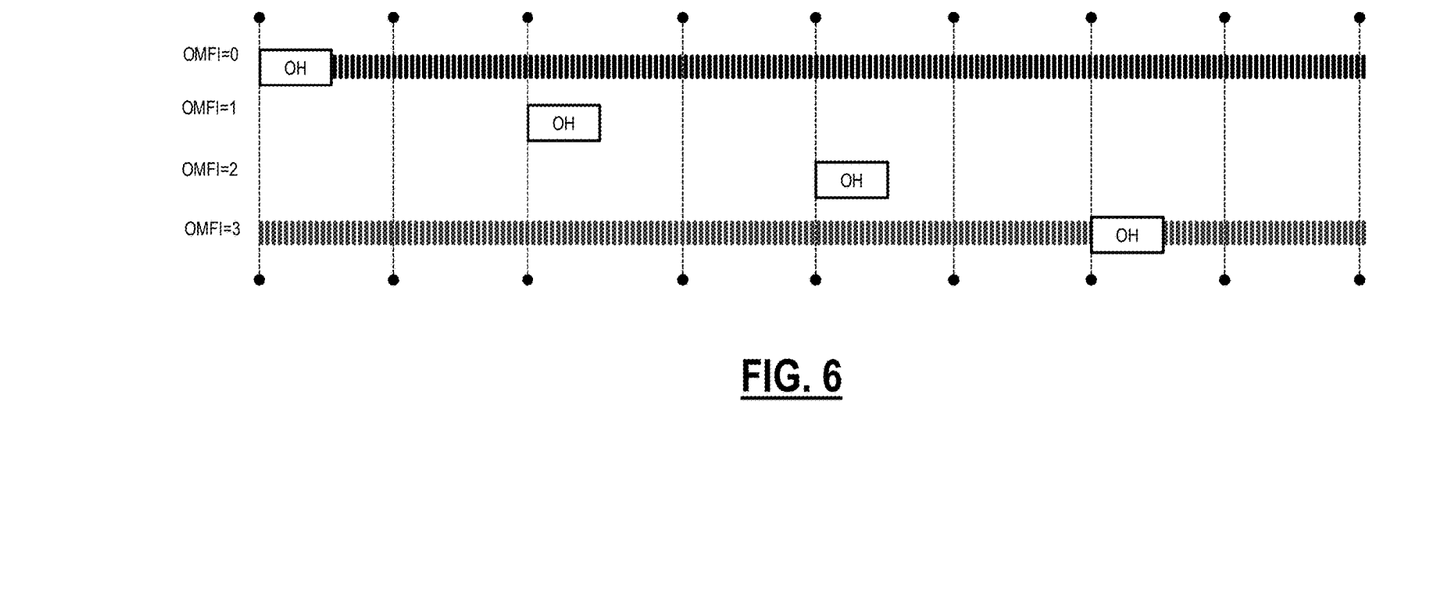
FIG. 6 is a diagram of cell adaptation with unallocated tributary slots.

Referring to FIG. 6, in an exemplary embodiment, cell adaptation is illustrated with unallocated tributary slots. In this example, tributary slots are occupied for OMFI=0, 3, but unallocated for OMFI=1, 2. Note, the OTN OH is still sent when there are unallocated tributary slots. A framer is needed to hunt for OTN FAS in cell stream (after reassembly), and no alignment of cells is needed. The framer looks for the normal frame position, or back to back OH cells if unused tributary.

Figure 7:
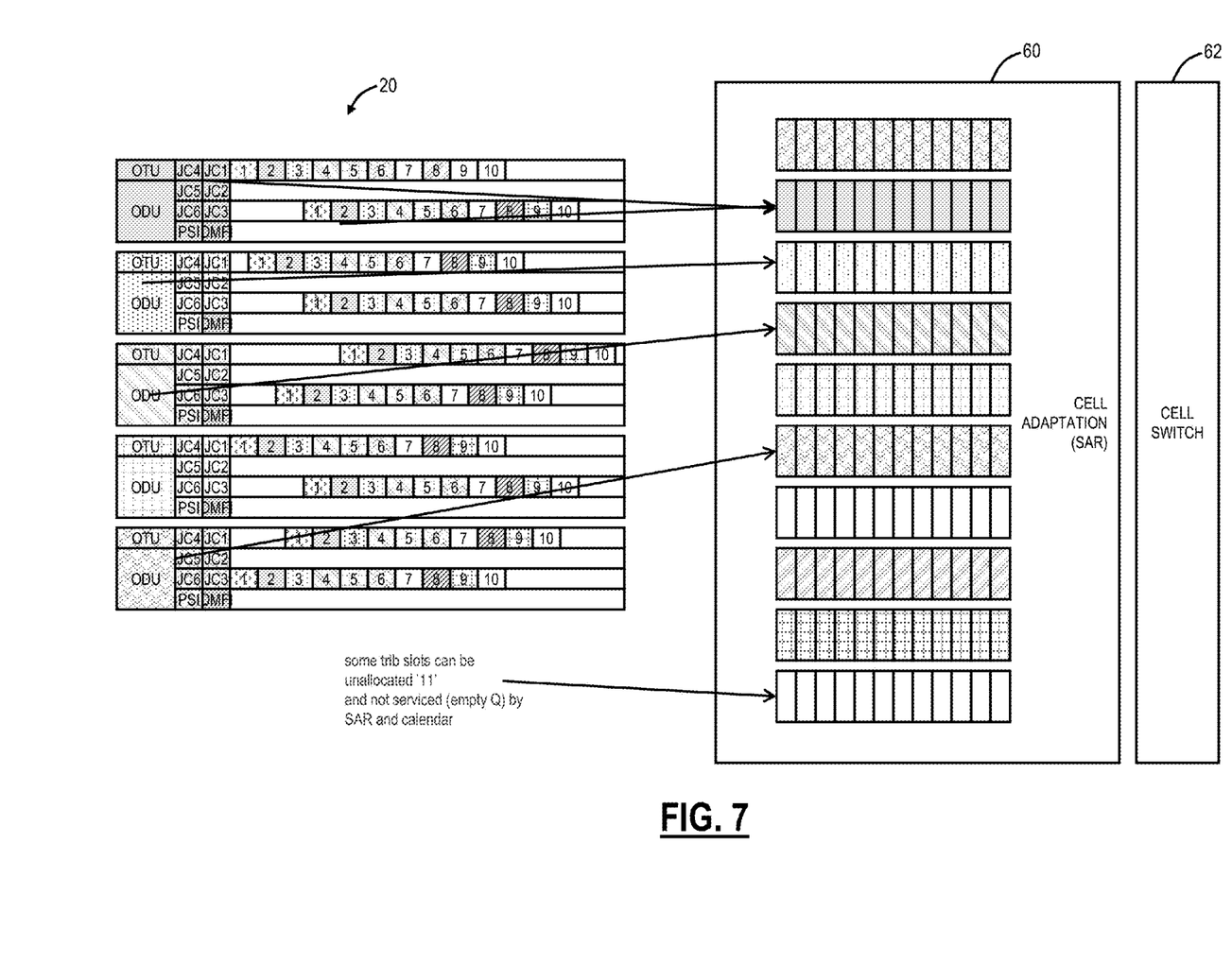
FIG. 7 is a block diagram of cell adaptation for different flows.

Referring to FIG. 7, in an exemplary embodiment, a block diagram illustrates the cell adaptation 22 for different flows. Here, the TS from multiple frames of OTUCn 20 are adapted into the cells via a cell adaptation function 60 (SAR). The cell adaptation function 60 can be implemented in circuitry with various queues or buffers. The cell adaptation function 60 connects to a cell switch 62 which is configured to provide the cells to the line adaptation 24.

Figure 8:
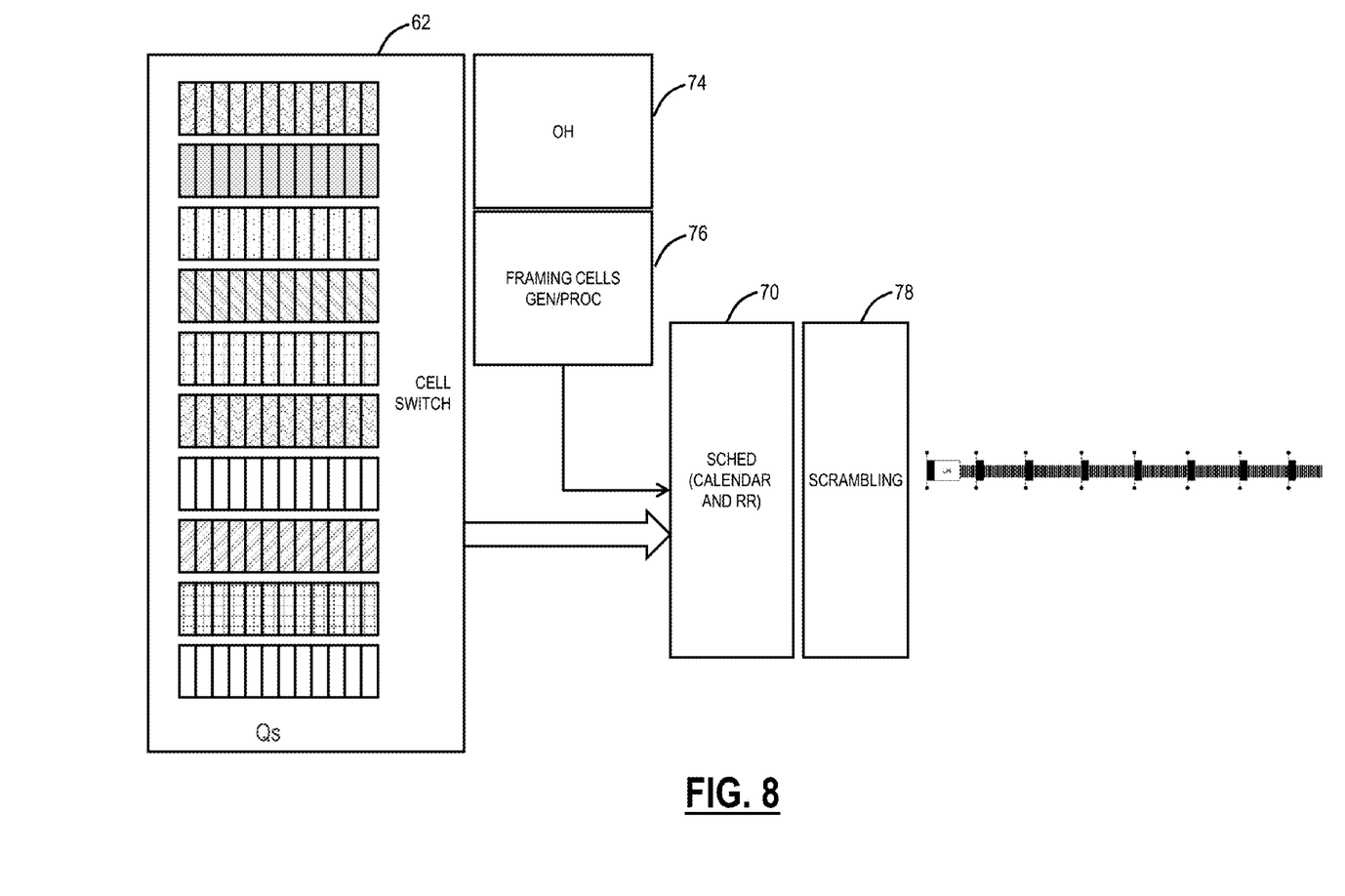
FIG. 8 is a block diagram of the line adaptation and a scheduler to service multiple flows.

Referring to FIG. 8, in an exemplary embodiment, a block diagram illustrates the line adaptation 24 and a scheduler 70. The line adaptation 24 includes circuitry after the cell switch 62, and the line adaptation 24 is configured to combine cells from all used and allocated flows using the scheduler 70. The scheduler 70 can utilize round-robin, a calendar, or the like. OH circuitry 74 and framing circuitry 76 also connects to the scheduler 70. Subsequent to the scheduler 70, scrambling circuitry 78 is configured to scramble the data.

Figure 9:
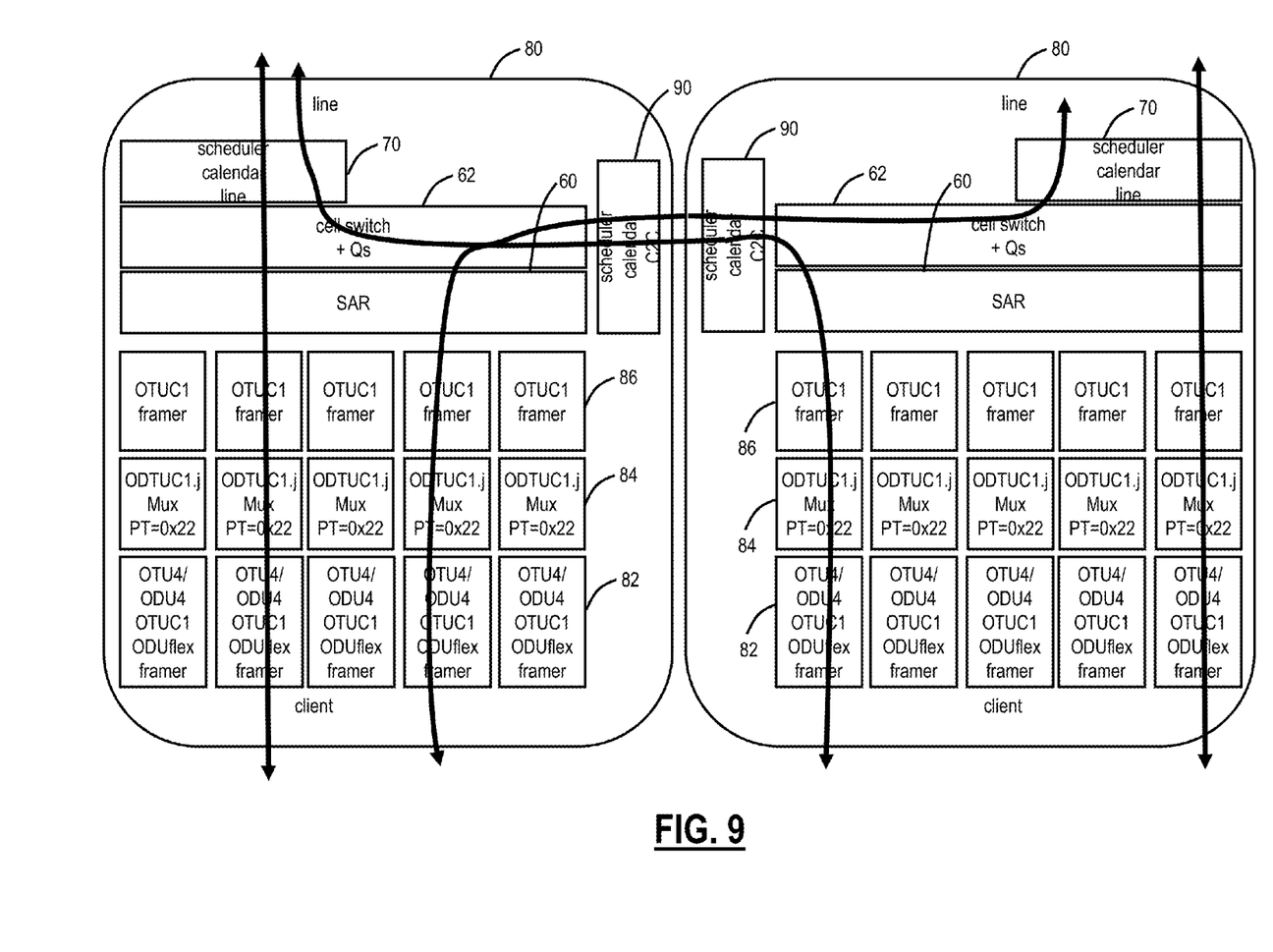
FIG. 9 is a block diagram of two 500 G adaptation circuits.

Referring to FIG. 9, in an exemplary embodiment, a block diagram illustrates two 500 G adaptation circuits 80. The 500 G adaptation circuits 80 perform the adaptation processes described herein and physically reside between client interface and optical modem. Note, for illustration purposes, two of the 500 G adaptation circuits 80 are illustrated to show scheduling between the 500 G adaptation circuits 80. The 500G adaptation circuits 80 include OTU4/ODU4/OTUC1/ODUflex framers 82 which is communicatively coupled to the client. The framers 82 are configured to operate at a client rate—OTU4/ODU4/OTUC1/ODUflex. The framers 82 are communicatively coupled to ODTUC1.j PT=0x22 multiplexers 84 (payload type=0x22).

The multiplexers 84 are configured to interface at tributary slots with the framers 82. The multiplexers 84 are communicatively coupled to OTUC1 framers 86 which are configured to interface the tributary slots. Subsequent to the OTUC1 framers 86, the cell adaptation function 60 (SAR) is configured to interface to the OTUC1s from the framers 86 with the 10× tributary slots therein. The cell adaptation function 60 (SAR) connection to the cell switch 62 which is communicatively coupled to the scheduler 70 and a scheduler 90 for cells between the 500 G adaptation circuits 80. Finally, the scheduler 70 is configured to interface to a modem for optical transmission of the cells.

Figure 10:
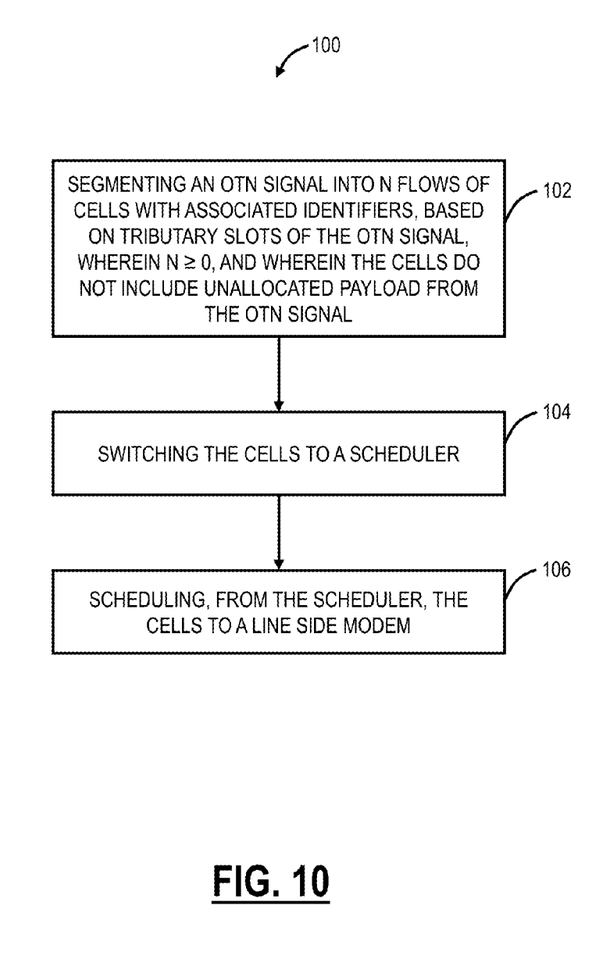
FIG. 10 is a flow chart of a process for Optical Transport Network (OTN) line side adaptation to provide sub-rate granularity and distribution.

Referring to FIG. 10, in an exemplary embodiment, a flow chart illustrates a process 100 for Optical Transport Network (OTN) line side adaptation to provide sub-rate granularity and distribution. The process 100 includes segmenting an OTN signal into N flows of cells with associated identifiers, based on tributary slots of the OTN signal, wherein N≥0, and wherein the cells do not include unallocated payload from the OTN signal (step 102). The process 100 also includes switching the cells to a scheduler (step 104). Finally, the process 100 includes scheduling, from the scheduler, the cells for a line side modem (step 106). Note, the steps 104, 106 can include switching the cells, with a scheduler, to one or more line side modems. The OTN signal can be one of a) from a client and the N flows of cells from the client are sent to different line side modems and b) from two or more clients and the N flows of cells from the two or more clients are sent to a same line side modem.

The segmenting can be determined based on the OMFI and MSI associated with the OTN signal, and N is based on a number of allocated tributary slots in the OTN signal. When N=0, only overhead is provided in the cells to the line side modem. The OTN signal is an Optical channel Transport Unit (C=100)×n (n=1, 2, 3, . . . ) (OTUCn) or a High Order or Super High Order OTN signal with tributary slots. The signal provided to the line side modem is a sub-rate of the OTUCn or the High Order or Super High Order OTN signal with tributary slots or a full-rate of the same signal. The scheduling can utilize round robin or a calendar. The method can further include inserting a framing cell to enable recovery from the line side modem. The scheduling can include scheduling some of the cells to a second line side modem.

In the various exemplary embodiments described herein, reference has been made to OTUCn for illustration purposes. Those of ordinary skill in the art will recognize the systems and methods can also be used on High Order (HO) OTN signals with corresponding tributary slots. For example, a HO OTU4 has 80 TSs of 1.25 G each, and the systems and methods described herein can enable transmission of less than the 80 TSs, i.e. a sub-rate, to provide a composite signal of less than 100 G to the line side modem when there are unallocated TSs. The systems and methods also contemplate operations with any Super High Order (SHO) OTN signal that may be developed. For example, OTUCn has been described herein where C=100 and n=1, 2, 3 . . . , and there may be other variants of this such as OTULn where L=50 and n=1, 2, 3, . . . for increments of 50 G (whereas the OTUCn has increments of 100 G). Any such embodiments are contemplated herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for Optical Transport Network (OTN) line side adaptation to provide sub-rate granularity and distribution, the method comprising:
subsequent to receiving an OTN signal, segmenting the OTN signal into N flows of cells with associated identifiers, based on tributary slots of the OTN signal, wherein N≥0, wherein, when N>0, the cells only include allocated payload from the OTN signal, and wherein, when N=0, the cells only include overhead; and
switching the cells, with a scheduler, to one or more line side modems such that the one or more line side modems only transmit on one or more line side allocated tributary slots when N>0 and overhead only without payload when N=0, wherein a rate of the one or more line side modems is independent from a rate of the OTN signal.

2. The method of claim 1, wherein the segmenting is determined based on an Optical channel Path Unit Multiframe Identifier (OMFI) and Multiplex Structure Identifier (MSI) associated with the OTN signal, and N is based on a number of allocated tributary slots in the OTN signal.

3. The method of claim 1, wherein, when N=0, only overhead is provided in the cells to the one or more line side modems.

4. The method of claim 1, wherein the OTN signal is an Optical channel Transport Unit (C=100)×n (n=1, 2, 3, ...) OTUCn or a High Order or Super High Order OTN signal with tributary slots.

5. The method of claim 4, wherein a signal provided to the one or more line side modems is a sub-rate or a full-rate of the OTUCn or the High Order or Super High Order OTN signal with tributary slots.

6. The method of claim 1, wherein the OTN signal is from a client and the N flows of cells from the client are sent to different line side modems.

7. The method of claim 1, wherein the OTN signal is from two or more clients and the N flows of cells from the two or more clients are sent to a same line side modem.

8. The method of claim 1, further comprising:
inserting a framing cell to enable recovery from the one or more line side modems.

9. The method of claim 1, wherein the switching includes switching some of the cells to a first line side modem and a second line side modem.

10. A circuit for Optical Transport Network (OTN) line side adaptation to provide sub-rate granularity and distribution, the circuit comprising
cell adaptation circuitry configured to segment, subsequent to receiving an OTN signal, the OTN signal into N flows of cells with associated identifiers, based on tributary slots of the OTN signal, wherein, when N>0, the cells only include allocated payload from the OTN signal and switch the cells to a scheduler, and wherein, when N=0, the cells only include overhead; and
line adaptation circuitry configured to schedule, from the scheduler, the cells for one or more line side modems such that the one or more line side modems only transmit on one or more line side allocated tributary slots when N>0 and overhead only without payload when N=0, wherein a rate of the one or more line side modems is independent from a rate of the OTN signal.

11. The circuit of claim 10, wherein the N flows are determined based on Optical channel Path Unit Multiframe Identifier (OMFI) and Multiplex Structure Identifier (MSI), and N is based on a number of allocated tributary slots in the OTN signal.

12. The circuit of claim 10, wherein, when N=0, only overhead is provided in the cells to the one or more line side modems.

13. The circuit of claim 10, wherein the OTN signal is an Optical channel Transport Unit (C=100)×n (n=1, 2, 3, ...) OTUCn or a High Order or Super High Order OTN signal with tributary slots.

14. The circuit of claim 13, wherein a signal provided to the one or more line side modems is a sub-rate or a full-rate of the OTUCn or the High Order or Super High Order OTN signal with tributary slots.

15. The circuit of claim 10, wherein the OTN signal is one of a) from a client and the N flows of cells from the client are sent to different line side modems and b) from two or more clients and the N flows of cells from the two or more clients are sent to a same line side modem.

16. The circuit of claim 10, wherein the line adaptation circuitry is further configured to switch some of the cells to a first line side modem and a second line side modem.

17. A system for Optical Transport Network (OTN) line side adaptation to provide sub-rate granularity and distribution, the system comprising:
a first adaptation circuit communicatively coupled to a first line side modem; and
a second adaptation circuit communicatively coupled to a second line side modem;
wherein each of the first adaptation circuit and the second adaptation circuit comprise
cell adaptation circuitry configured to, subsequent to receiving an OTN signal, the OTN signal into N flows of cells with associated identifiers, based on tributary slots of the OTN signal, wherein N≥0, wherein, when N>0, the cells only include allocated payload from the OTN signal and switch the cells to a scheduler, and wherein, when N=0, the cells only include overhead, and
line adaptation circuitry configured to schedule, from the scheduler, the cells for one or more line side modems such that the one or more line side modems only transmit on one or more line side allocated tributary slots when N>0 and overhead only without payload when N=0, wherein a rate of the one or more line side modems is independent from a rate of the OTN signal.

18. The system of claim 17, wherein the N flows are determined based on Optical channel Path Unit Multiframe Identifier (OMFI) and Multiplex Structure Identifier (MSI), and N is based on a number of allocated tributary slots in the OTN signal.

19. The system of claim 17, wherein the OTN signal is an Optical channel Transport Unit (C=100)×n (n=1, 2, 3, ...) OTUCn or a High Order or Super High Order OTN signal with tributary slots, and wherein a signal provided to the one or more line side modems is a sub-rate or a full-rate of the OTUCn or the High Order or Super High Order OTN signal.

20. The circuit of claim 17, wherein the first adaptation circuit and the second adaptation circuit are communicatively coupled to one another and configured to provide one or more of the cells to one another.

* * * * *